(12) United States Patent
Ahmed et al.

(10) Patent No.: US 11,447,099 B2
(45) Date of Patent: Sep. 20, 2022

(54) MULTIPLEXED ANTENNA CIRCUIT NETWORK FOR ULTRA-HIGH FREQUENCY LOW ENERGY BASED PHONE AS A KEY ACCESS TO A VEHICLE

(71) Applicants: DENSO International America, Inc., Southfield, MI (US); DENSO CORPORATION, Kariya (JP)

(72) Inventors: Osman Ahmed, Bloomfield Hills, MI (US); Jagadeesh Krishnamurthy, Troy, MI (US); Yuki Tokunaga, Kariya (JP)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/996,181

(22) Filed: Aug. 18, 2020

(65) Prior Publication Data

US 2021/0061225 A1    Mar. 4, 2021

Related U.S. Application Data

(60) Provisional application No. 62/893,909, filed on Aug. 30, 2019.

(51) Int. Cl.
*H04W 12/06* (2021.01)
*H04W 4/40* (2018.01)
(Continued)

(52) U.S. Cl.
CPC ........... *B60R 25/245* (2013.01); *H04W 4/023* (2013.01); *B60R 2325/101* (2013.01); *B60R 2325/205* (2013.01)

(58) Field of Classification Search
CPC .................................................... B60R 25/245
See application file for complete search history.

(56) References Cited

U.S. PATENT DOCUMENTS 5,710,548 A    1/1998 LeMense
8,319,605 B2*  11/2012 Hassan ................. G01S 13/825
                                                    340/5.72
(Continued)

FOREIGN PATENT DOCUMENTS

BR    102014017465 A2    2/2016
CN    104574593 A        4/2015
(Continued)

OTHER PUBLICATIONS

"An Alternative Double-Sided Two-Way Ranging Method", Dries Neirynck, et al., 2016 13th Workshop on Positioning, Navigation and Communications (WPNC), Jan. 19, 2017.

*Primary Examiner* — Joseph H Feild
*Assistant Examiner* — Pameshanand Mahase
(74) *Attorney, Agent, or Firm* — Harness, Dickey & Pierce, P.L.C.

(57) ABSTRACT

A system includes antenna circuits void of transceivers, a multiplexer connected to the antenna circuits, a transceiver and a control module. The transceiver is connected to the multiplexer and cycles through the antenna circuits to facilitate determination of a location of a portable access device relative to a vehicle. The transceiver allocates periods of time for each of the antenna circuits and during each period of time exchanges radio frequency signals with the portable access device to obtain timing information associated with transmission of the radio frequency signals or a range estimate of the portable access device relative to the vehicle. The range estimates are estimates of distances between the antenna circuits and the portable access device. The location is determined based on the timing information or the range estimates. The control module, based on the determined location, provides access to the vehicle or control of a vehicle system.

24 Claims, 10 Drawing Sheets

(51) Int. Cl.
*B60R 25/24* (2013.01)
*H04W 4/02* (2018.01)

(56) References Cited

U.S. PATENT DOCUMENTS

| | | | |
|---|---|---|---|
| 9,688,247 B1 | 6/2017 | Jayaraman et al. | |
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 10,244,476 B2 | 3/2019 | Elangovan et al. | |
| 10,328,898 B2 | 6/2019 | Golsch et al. | |
| 10,328,899 B2 | 6/2019 | Golsch | |
| 10,328,900 B1 | 6/2019 | Yakovenko et al. | |
| 10,328,988 B2 * | 6/2019 | Bang | B62K 15/006 |
| 2009/0309714 A1 * | 12/2009 | Baruco | H04W 4/48 |
| | | | 340/539.11 |
| 2010/0081458 A1 * | 4/2010 | Sheynblat | H04W 4/02 |
| | | | 455/456.4 |
| 2011/0215921 A1 | 9/2011 | Ben Ayed et al. | |
| 2012/0045058 A1 | 2/2012 | Weghaus | |
| 2014/0274013 A1 | 9/2014 | Santavicca | |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0297531 A1 | 10/2017 | Sakamoto | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 * | 4/2018 | Golsch | B60R 25/20 |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0213355 A1 | 7/2018 | Smith et al. | |
| 2018/0269565 A1 | 9/2018 | Guthrie et al. | |
| 2020/0120509 A1 * | 4/2020 | Stitt | G01S 13/765 |

FOREIGN PATENT DOCUMENTS

| WO | 16156682 A1 | 10/2016 |
|---|---|---|
| WO | 2017181050 A1 | 10/2017 |
| WO | 18040641 A1 | 3/2018 |

* cited by examiner

MULTIPLEXED ANTENNA CIRCUIT NETWORK FOR ULTRA-HIGH FREQUENCY LOW ENERGY BASED PHONE AS A KEY ACCESS TO A VEHICLE

CROSS-REFERENCE TO RELATED APPLICATIONS

This application claims the benefit of U.S. Provisional Application No. 62/893,909, filed on Aug. 30, 2019. The entire disclosure of the above application is incorporated herein by reference.

FIELD

The present disclosure relates to passive vehicle access systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional passive entry/passive start (PEPS) systems allow keyless entry including providing a user access to various vehicle functions if the user possesses a key fob that has been paired with an in-vehicle PEPS electronic control unit (or PEPS module). As an example, the user in possession of the key fob may approach a vehicle having the PEPS module. The key fob communicates with the PEPS module and if the key fob is authenticated, the PEPS module may unlock doors of the vehicle. The PEPS module (i) performs an authentication process to determine if the key fob is authorized to access the vehicle, and (ii) determines a range and/or location of the key fob relative to the vehicle. The authentication process may include the exchange of an encrypted password or signature. If the password or signature is correct, then the key fob is determined to be authorized. Range and/or location of the key fob may be determined based on, for example, strength of a signal received from the key fob. If the key fob is authenticated and is located within an authorized zone of the vehicle, then access to the interior of the vehicle is permitted without use of a traditional key.

As another example, the user in possession of the key fob may activate a vehicle function by pushing a button on the key fob. In response to pushing the button, the key fob communicates with the PEPS module and if the key fob is authenticated and within a predetermined distance of the vehicle, the PEPS module performs the stated function (e.g., starts the vehicle, opens a door, sets off an alarm, etc.) associated with the button pressed on the key fob. The communication performed for the two examples may include the key fob and the PEPS module performing a one-way low-frequency (LF) wake-up function and a one-way or two-way radio frequency (RF) authentication function.

A phone as a key (PAK) vehicle access system can operate similarly as the stated PEPs system, except the vehicle is accessed using a mobile phone rather than a key fob. As an example, the mobile phone can communicate with a PAK module or a telematics control unit (TCU) in the vehicle to begin an access pairing process. The mobile phone and either the PAK module or the TCU perform the access pairing process to establish a trust relationship. The pairing process can include Bluetooth® pairing whereby: security information is exchanged between the mobile phone and the vehicle directly; a mobile phone address, a mobile phone identity resolving key, a reservation identifier and/or an encryption key are exchanged via a cloud-based network; and/or the mobile phone presents a certificate to the vehicle, where the certificate is signed by (i) the mobile phone, (ii) a trusted security signing authority such as a manufacturer of the vehicle, and/or (iii) a trusted third party. In the case of a certificate, the certificate can include an identifier of a person authorized to access a vehicle, an identifier of a cloud-based network authorized to transfer the certificate, an identifier of a rental or lease agreement of the vehicle, an identifier of the vehicle, a date and time period during which the vehicle is permitted for use by the authorized person, and/or other restrictions and/or access/license information.

For passive entry, some user action is typically needed to initiate a process of waking up a key fob or mobile phone (referred to as portable access devices). For example, this may include a user approaching the vehicle with a portable access device and/or touching and/or pulling on a door handle. When a PEPS module or a PAK module, which are referred to as access modules, detects this behavior, the access module performs a localization process to begin searching for and waking up the key fob.

A controller of the key fob measures a LF signal level during communication with the access module. The controller determines a received signal strength indicator (RSSI) and provides the RSSI to the access module. The access module then determines a location of the key fob based on the RSSI.

A smartphone, a wearable device, and/or other smart portable network device may perform as a key fob. The smart portable network devices may enable various vehicle functions and long range distancing features, such as passive welcome lighting, distance bounding on remote parking applications, etc.

SUMMARY

A system is provided and includes first antenna circuits void of transceivers, a first multiplexer connected to the first antenna circuits, a first transceiver and a control module. The first transceiver is connected to the first multiplexer and configured to cycle through the first antenna circuits to facilitate determination of a location of a portable access device relative to a vehicle. The first transceiver is configured to allocate periods of time for each of the first antenna circuits and during each period of time exchange radio frequency signals with the portable access device to obtain at least one of (i) timing information associated with transmission of the radio frequency signals, (ii) received signal strength indicator information associated with transmission of the radio frequency signals, or (iii) a range estimate of the portable access device relative to the vehicle. The range estimates are estimates of distances between the first antenna circuits and the portable access device. The location is determined based on the at least one of the timing information, received signal strength indicator information or the range estimates. The control module is configured to, based on the determined location, provide at least one of access to the vehicle or control of a vehicle system.

In other features, the exchanged radio frequency signals include ultra-wideband signals. In other features, the exchanged radio frequency signals are wireless personal area network signals at a frequency of 2.4 GHz.

In other features, the system further includes second antenna circuits, a second multiplexer connected to the second antenna circuits, and a second transceiver. The second transceiver is connected to the second multiplexer and configured to cycle through the second antenna circuits to facilitate determination of the location of the portable access device relative to the vehicle. The second transceiver is configured to allocate periods of time for each of the second antenna circuits and during each period of time exchange second radio frequency signals with the portable access device to obtain at least one of (i) timing information associated with transmission of the second radio frequency signals, (ii) received signal strength indicator information associated with transmission of the second radio frequency signals, or (iii) a range estimate of the portable access device relative to the vehicle. The range estimates obtained by the second transceiver are estimates of distances between the second antenna circuits and the portable access device, and wherein the location is determined based on the at least one of the timing information, received signals strength indicator information or the range estimates obtained by the second transceiver.

In other features, at least one of the first transceiver or the first multiplexer is implemented as part of the control module.

In other features, the timing information includes timestamps of the exchanged radio frequency signals, round trip times associated with the exchanged radio frequency signals, a time delay at the first transceiver, and a time delay at the portable access device.

In other features, the first transceiver is configured to determine the location based on the at least one of the timing information, the received signal strength indicator information or the range estimates. In other features, the control module is configured to determine the location based on the at least one of the timing information, the received signal strength indicator information or the range estimates.

In other features, the first transceiver is configured to determine the range estimates based on the timing information. In other features, the first transceiver is configured to determine the range estimates based on the received signal strength indicator information. In other features, the first transceiver is configured to receive the range estimates from the portable access device.

In other features, a system is provided and includes an actuator and a body control module. The body control module includes a first multiplexer, a first transceiver and an access module. The first multiplexer is connected to first antenna circuits. The antenna circuits are separate from the body control module and are disposed in respective locations on a vehicle. The first transceiver is connected to the first multiplexer and configured to cycle through the first antenna circuits to facilitate determination of a location of a portable access device relative to the vehicle. The first transceiver is configured to, for each of the first antenna circuits, exchange radio frequency signals with the portable access device to obtain at least one of (i) timing information associated with transmission of the radio frequency signals, (ii) received signal strength indicator information associated with transmission of the radio frequency signals, or (iii) a range estimate of the portable access device relative to the vehicle. The range estimates are estimates of distances between the first antenna circuits and the portable access device. The location is determined based on the at least one of the timing information, received signal indicator information or the range estimates. The access module is configured to, based on the determined location, control the actuator to provide at least one of access to the vehicle or control of a vehicle system.

In other features, the exchanged radio frequency signals include ultra-wideband signals. In other features, the exchanged radio frequency signals are wireless personal area network signals at a frequency of 2.4 GHz.

In other features, the body control module further includes a second multiplexer and a second transceiver. The second multiplexer is connected to second antenna circuits. The second transceiver is connected to the second multiplexer and configured to cycle through the second antenna circuits to facilitate determination of the location of the portable access device relative to the vehicle. The second transceiver is configured to, for each of the second plurality of antenna circuits, exchange second radio frequency signals with the portable access device to obtain at least one of (i) timing information associated with transmission of the second radio frequency signals, (ii) received signal strength indicator information associated with transmission of the second radio frequency signals, or (iii) a range estimate of the portable access device relative to the vehicle. The range estimates obtained by the second transceiver are estimates of distances between the second plurality of antenna circuits and the portable access device. The location is determined based on the at least one of the timing information, received signal strength indicator information or the range estimates obtained by the second transceiver.

In other features, the timing information includes at least one of (i) timestamps of the exchanged radio frequency signals, (ii) round trip times associated with the exchanged radio frequency signals, (iii) a time delay at the first transceiver, or (IV) a time delay at the portable access device. The body control module is configured to determine the location based on the timing information.

In other features, the body control module is configured to determine the location based on the range estimates. In other features, the first transceiver is configured to determine the location based on the at least one of the timing information, the received signal strength indicator information or the range estimates.

In other features, the access module is configured to determine the location based on the at least one of the timing information, the received signal strength indicator information or the range estimates. In other features, the first transceiver is configured to determine the range estimates based on the timing information. In other features, the first transceiver is configured to determine the range estimates based on the received signal strength indicator information. In other features, the first transceiver is configured to receive the range estimates from the portable access device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
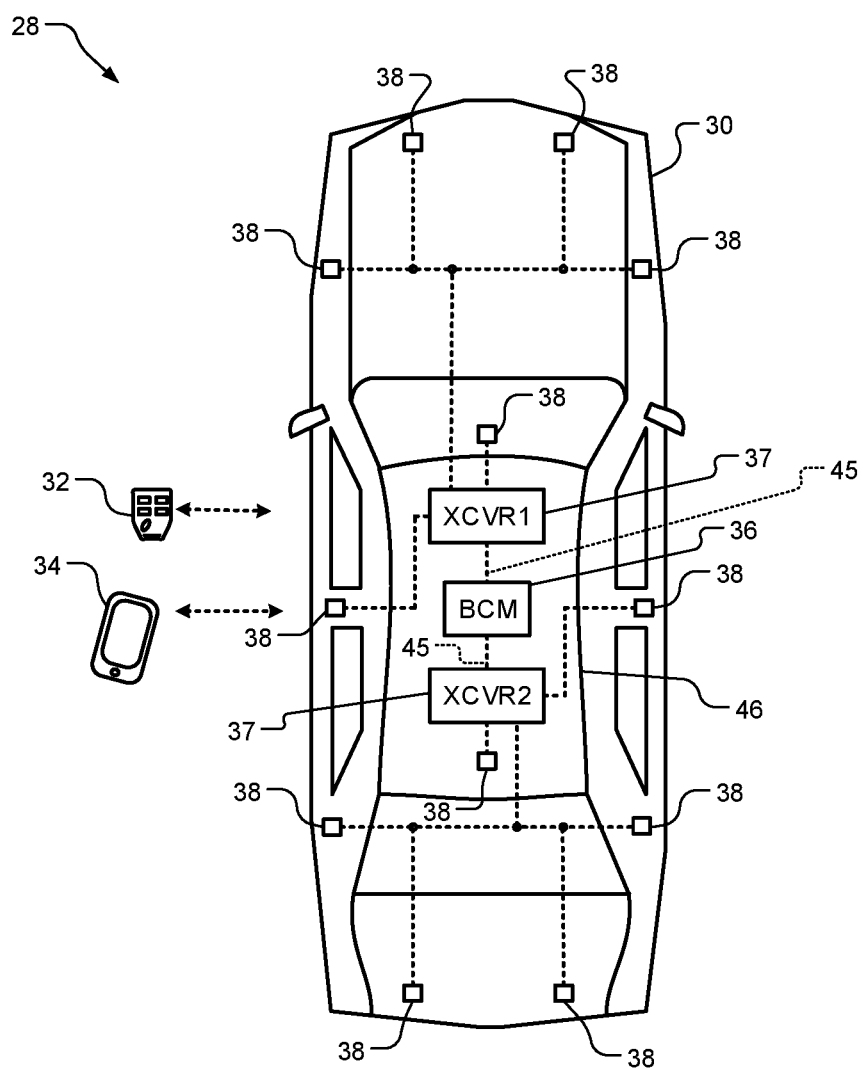
FIG. 1 is a functional block diagram of an example of a vehicle access system including body control module, transceivers, antenna circuits, and portable access devices in accordance with the present disclosure.

A PAK system of a vehicle may include a body control module and multiple localization anchors disposed at respective locations on the vehicle. Each of the localization anchors may include a serial communication interface, a radio frequency (RF) transceiver, a RF front end module and a power source. The RF front end module may include an antenna, a filter, a balance circuit, passive components, etc. The RF transceiver may communicate with a portable access device, such as a key fob or a mobile phone, and determine a range of the portable access device relative to the vehicle. This information may be shared with the body control module, which may then determine a location of the portable access device based on the range information received from the localization anchors.

A PAK system may include numerous localization anchors, including respective RF transceivers and antennas, which may be disposed in respective locations on a vehicle. The RF transceivers and antennas are collocated, meaning, for example, connected to and/or implemented on the same substrate (or printed circuit board). The PAK system may have a 1:1 ratio between the number of localization anchors and the number of RF transceivers. The number of localization anchors can depend on the coverage area being monitored. The larger the coverage area, the more localization anchors that may be used. The more localization anchors, the more costly and complex the PAK system and the more space needed within the vehicle. The PAK system may include low energy sensors, ultra-wideband (UWB) sensors and/or Bluetooth® low-energy (BLE) nodes (e.g., BLE transceivers and antennas) installed throughout a vehicle. The LF sensors and/or the BLE nodes may be used to "wake up" a portable access device (e.g., a keyfob, a mobile phone, a wearable device, etc.). The LF sensors, the UWB sensors and/or the BLE nodes may be used to determine the range and/or location of the mobile device relative to the vehicle.

The examples set forth herein include PAK systems including a body control module (or vehicle control module), one or more transceivers, one or more multiplexers, and antenna circuits. Each of the antenna circuits includes one or more antennas and may include a passive circuit including filters, balancing circuits, etc. The antenna circuits do not include transceivers and are different than the above-described localization anchors. The PAK systems include a minimum number of transceivers, where the ratio of transceivers to antenna circuits is 1:N, wherein N is greater than or equal to 2. As an example, the ratio may be 1:4, 1:5, 1:6 or smaller such that there are many antenna circuits for each transceiver. The transceivers may either be (i) not collocated with the antenna circuits, or (ii) collocated with a minimum number (e.g., 1 or 2) of the antenna circuits while not being collocated with other ones of the antenna circuits. In one embodiment, the transceivers are implemented separate from a body control module. In another embodiment, one or more transceivers are implemented as part of a body control module. In yet another embodiment, no transceiver is implemented separate from the body control module.

The stated implementations minimize the number of transceivers per PAK system and/or vehicle, reduce space utilized within a vehicle by transceivers, allow for reduced sized antenna circuits having a minimum number of components, reduce the amount of space utilized by the antenna circuits, and reduce the amount of communication between a body control module and transceivers. Smaller antenna circuits allows for packaging of the antenna circuits in tight vehicle locations. The multiplexed architecture disclosed herein allows the number of antennas and antenna circuits to be increased without overhead of increasing the number of transceivers. The reduced number of transceivers also reduces the vehicle network bandwidth utilized and/or associated with the transceivers. The number of transceivers of a PAK system and/or a vehicle may be as low as one. When the included one or more transceivers are implemented by the BCM, communication between the BCM and the transceivers is eliminated. The reduced number of transceivers also reduces the amount of power consumed.

The reduced number of transceivers also improves overall system clock synchronization of the BCM and transceivers. Transceivers can introduce clock timing shifts, which can negatively affect TOF measurements and estimations. For this reason, the more transceivers included, the higher the probability of timing errors and/or TOF estimation errors. By reducing the number of transceivers, the probability of timing errors and/or TOF estimation errors are reduced for improved TOF estimation accuracy.

By providing additional available space in locations of the antenna circuits, larger antennas may be utilized for improved communication between a vehicle and portable access devices. In addition, time-of-flight (TOF) measurements are able to be performed using a minimum number of transceivers (e.g., 1 or 2 transceivers) and a large number of antenna circuits (e.g., 10 or more), which can improve overall security. This is because there are a minimum number of transceivers and the transceivers may be implemented by the body control module (BCM) or within the vehicle making it difficult for an intruder to gain access to and/or control features of the vehicle.

The PAK systems disclosed herein may include LF sensors, the UWB sensors and/or the BLE nodes, which either (i) do not include transceivers, or (ii) a small number (e.g., 1-3) of these sensors and/or nodes include transceivers. The transceivers may be implemented (i) separate from the sensors and nodes, and/or (ii) as part of a BCM.

The examples set forth herein include access systems, such as PAK systems, that include mobile devices (or portable access devices) and vehicle access devices communicating with each other and determining ranges and locations of the portable access devices. This may be based on, for example, TOF measurements for transmitted ultra-high frequency (UHF) low energy signals (e.g., Bluetooth® low energy signals), ultra-wideband (UWB) signals and/or other RF signals.

FIG. 1 shows a vehicle access system 28 that performs as a passive entry/passive start (PEPS) system and a PAK system. The vehicle access system 28 includes a vehicle 30 and may include a key fob 32, a mobile phone 34, and/or other portable access devices, such as a wearable device, a laptop computer, or other portable network device. The portable access devices may be, for example, a Bluetooth®-enabled communication device, such as a smart phone, smart watch, wearable electronic device, key fob, tablet device, or other device associated with a user of the vehicle 30. The user may be an owner, driver, or passenger of the vehicle 30 and/or a technician for the vehicle 30.

Figure 2:
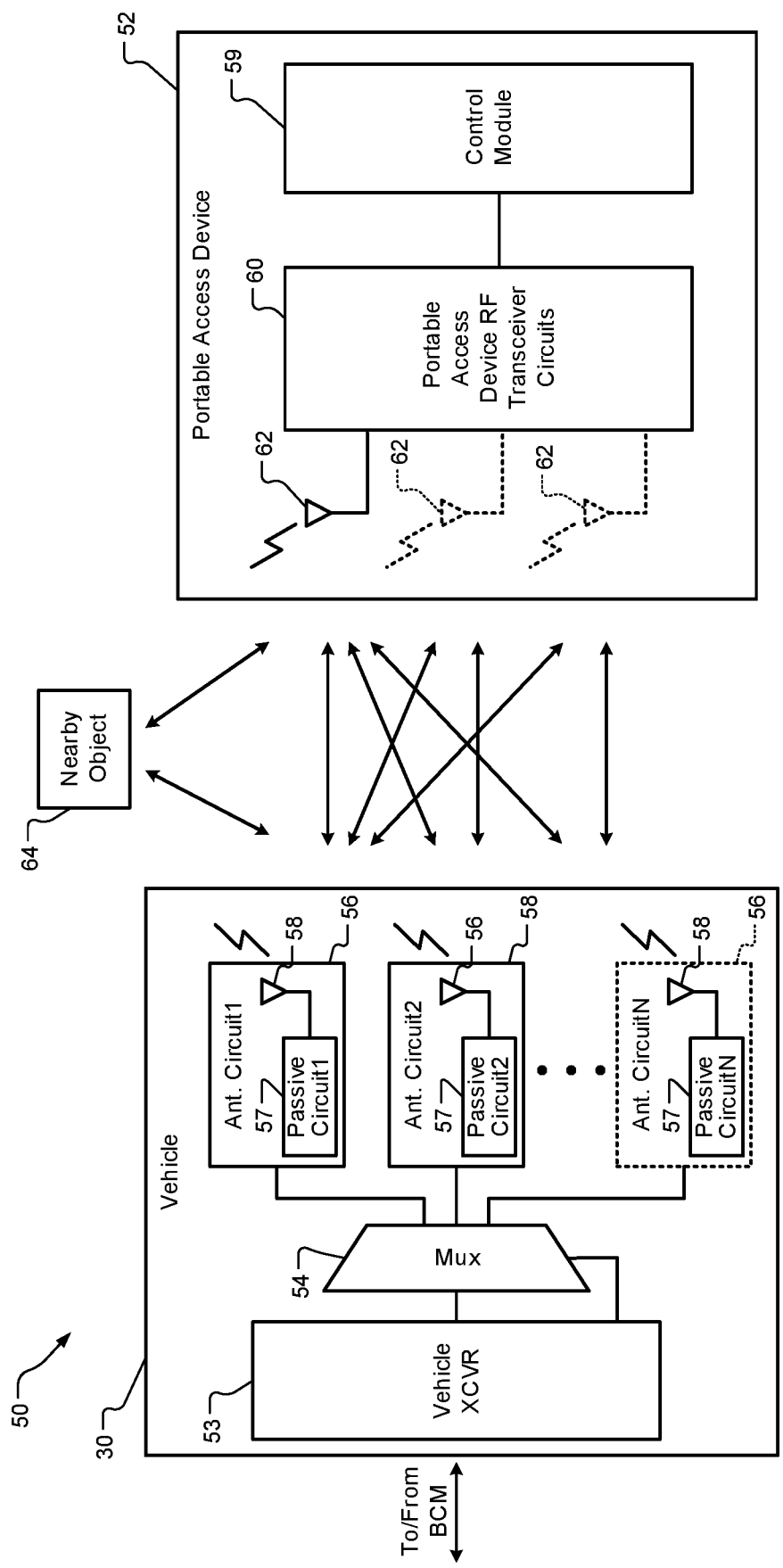
FIG. 2 is a functional block diagram of an example of a two-way access communication system in accordance with the present disclosure.
Figure 3:
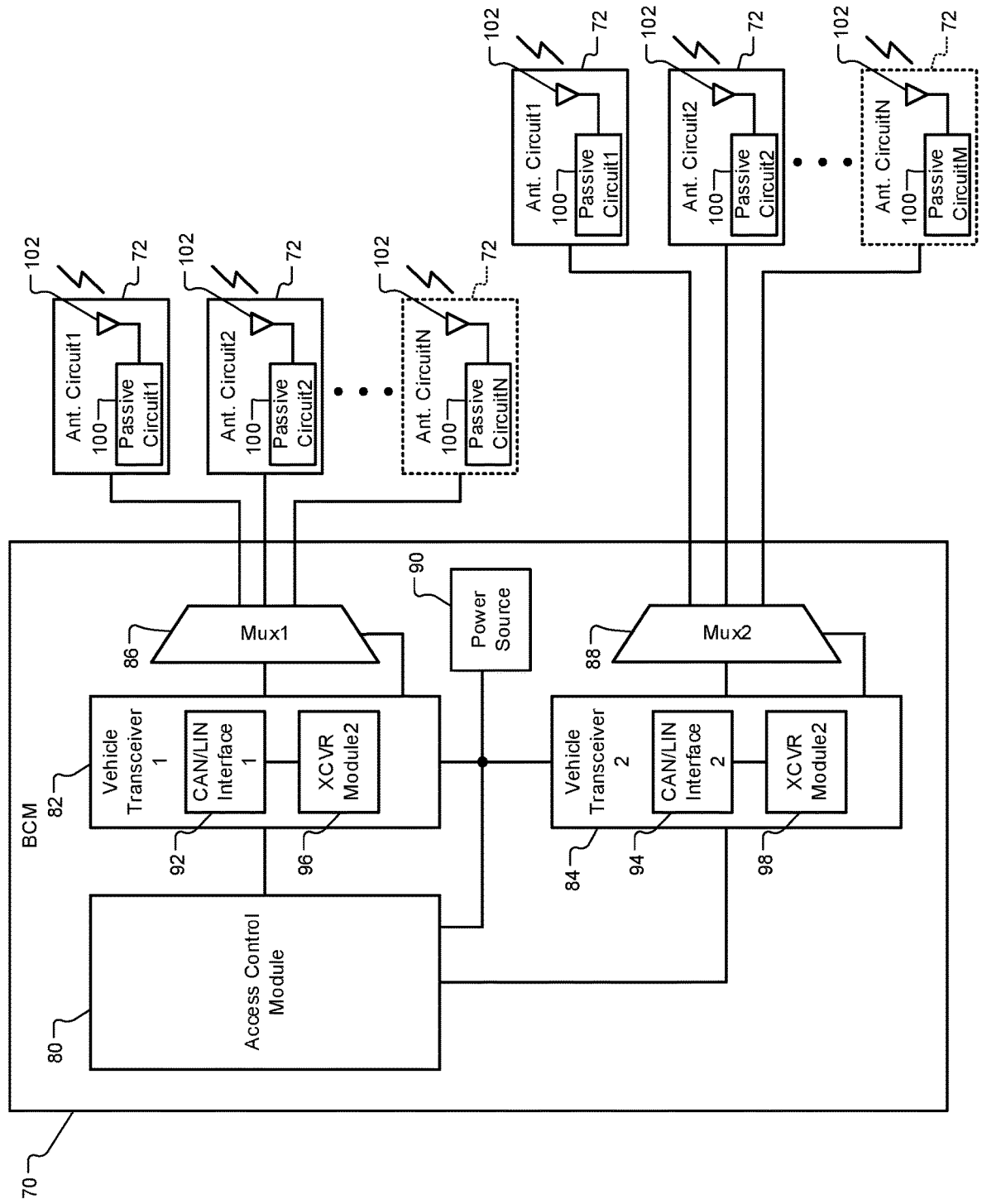
FIG. 3 is a functional block diagram of an example of a body control module and antenna circuits in accordance with the present disclosure.

The vehicle 30 includes a BCM (or vehicle control module) 36, one or more transceivers (XCVRs) 37 and antenna circuits 38. One or more of the transceivers 37 may be implemented as part of the BCM 36. Each of the transceivers 37 may include a multiplexer (not shown in FIG. 1) and be connected to a respective set of the antenna circuits 38. Example multiplexers are shown in FIGS. 2-3. Although a particular number of antenna circuits are shown in particular locations on the vehicle 30, a different number of antenna circuits may be included and the antenna circuits may be in different locations than shown. Also, although each of the transceivers 37 are shown as being connected to certain antenna circuits, the transceivers 37 may be connected to different antenna circuits.

As an example, the antenna circuits 38 may each be implemented as one or more antennas. The antenna circuits 38 may include passive components as further described below. The transceivers 37 may wirelessly transmit and receive LF, BLE and/or UWB signals via the antenna circuits 38 including wirelessly communicating with the portable access devices. As an example, the UWB signals may be spread over a large bandwidth of greater than 500 Mega-Hertz (MHz). The LF, BLE and/or UWB signals may be transmitted to and/or received from the portable access devices and used to track a location and movement of the portable access devices. Although particular numbers of antenna circuits 38 are shown, any number of each may be utilized. The BCM 36 may communicate with the transceivers 37 wirelessly and/or via a vehicle interface 45. As an example, the vehicle interface 45 may include a controller area network (CAN) bus, a local interconnect network (LIN) for lower data-rate communication, a clock extension peripheral interface (CXPI) bus and/or one or more other vehicle interfaces. The transceivers 37 may be connected wirelessly or via wires to the antenna circuits 38. The BCM 36 may "wake up" the transceivers 37 via the vehicle interface 45. The transceivers 37 may then exchange signals with one of the portable access devices 32, 34 to synchronize the transceivers 37 to the portable access device and provide a secure link between the transceivers 37 and the portable access device.

The antenna circuits 38 may be at various locations on the vehicle and transmit and receive low frequency signals (e.g., 125 kHz signals), high frequency RF (e.g., BLE) signals and/or UWB signals. Each of the antenna circuits 38 includes one or more LF, RF (or BLE) and/or UWB antennas and may include circuitry for LF, RF (or BLE) and/or UWB signal transmission and/or filtering.

The transceivers 37 may transmit, via the antenna circuits 38, BLE signals according to BLE communication protocols. Alternatively, the transceivers 37 may communicate via the antenna circuits 38 according to other wireless communication protocols, such as wireless fidelity (Wi-Fi). In one embodiment and to improve signal coverage relative to the vehicle and improve transmission and reception characteristics, some of the antenna circuits 38 are located in a roof 46 of the vehicle 30.

FIG. 2 shows a two-way access communication system 50 that includes the vehicle 30 and a portable access device 52 (e.g., one of the portable access devices 32, 34 of FIG. 1). The vehicle 30 may include a vehicle transceiver 53 (e.g., one of the transceivers 37 of FIG. 1), a multiplexer 54, and N antenna circuits 56, where N is an integer greater than or equal to 2. The antenna circuits 56 may include passive circuits 57 and antennas 58.

The portable access device 52 includes a control module 59, portable access device RF transceiver circuits 60 and one or more antennas 62. UHF low energy signals (e.g., BLE signals) are transmitted between the vehicle transceivers 53 and the RF transceiver circuits 60 using the antennas 58, 62. TOF of transmitted signals and angles of arrival of the transmitted signals may be determined at the vehicle 30 and/or at the portable access device 52. Angles of departure may also be determined at the vehicle and/or at the portable access device. This includes angles of arrival (AOAs) and angles of departure (AODs) of signals transmitted along direct paths between the vehicle 30 and the portable access device 52 and signals that are reflected off one or more nearby objects (e.g., the nearby object 64).

In the two-way access communication system 50, the portable access device 52 may be used as a key for vehicle passive functions. When the portable access device 52 is within a predetermined range of the vehicle 30, the portable access device 52 may be granted access for one or more requested functions. As an example, when the portable access device 52 is granted access, the control module 59 may transmit a command signal to the BCM 36 and/or other module of the vehicle 30 instructing the module to automatically park the vehicle 30. Other functions may be performed, such as locking or unlocking doors and/or windows, opening doors or windows, tuning on and/or setting parameters of a heating ventilation and air-conditioning (HVAC) system, turning on or off lights and/or an engine, etc. Determination of whether the portable access device 52 is within the predetermined range of the vehicle 30 may be based on range and location information of the portable access device 52 relative to the vehicle 30. The range and location information may be determined, for example, based on the TOF measurements, round trip times, AOAs, AODs, and/or other information referred to herein.

FIG. 3 shows a BCM 70 and antenna circuits 72. The BCM 70 and the antenna circuits 72 may replace the BCM 36 and the antenna circuits 38 of FIG. 1. The BCM 70 may include an access control module 80, vehicle transceivers (or simply "transceivers") 82, 84, multiplexers 86, 88 and a power source 90. The power source 90 may supply power to the access control module 80, and/or the transceivers 82, 84 as shown. The power source 90 may also power the multiplexers 86, 88. The transceivers 82, 84 may include and/or be connected to CAN or LIN interfaces 92, 94 The transceivers 82, 84 may include transceivers 96, 98.

The access module 80 may communicate with and/or control operation of the transceivers 82, 84. The transceivers 82, 84 may determine and/or receive range and/or location information and share this information with the access module 80. The access module 80 may perform various functions as further described below based on the range and/or location information. In one embodiment, the transceivers 82, 84 and/or one or more portable access devices calculate the ranges and/or locations of the portable access devices. In another embodiment, the access module 80 determines the range and/or location information based on measurements performed by the transceivers 82, 84 and/or the portable access devices. Measurement data may be shared with the access module 80, which may then calculate ranges and/or locations of the portable access devices.

Figure 6:
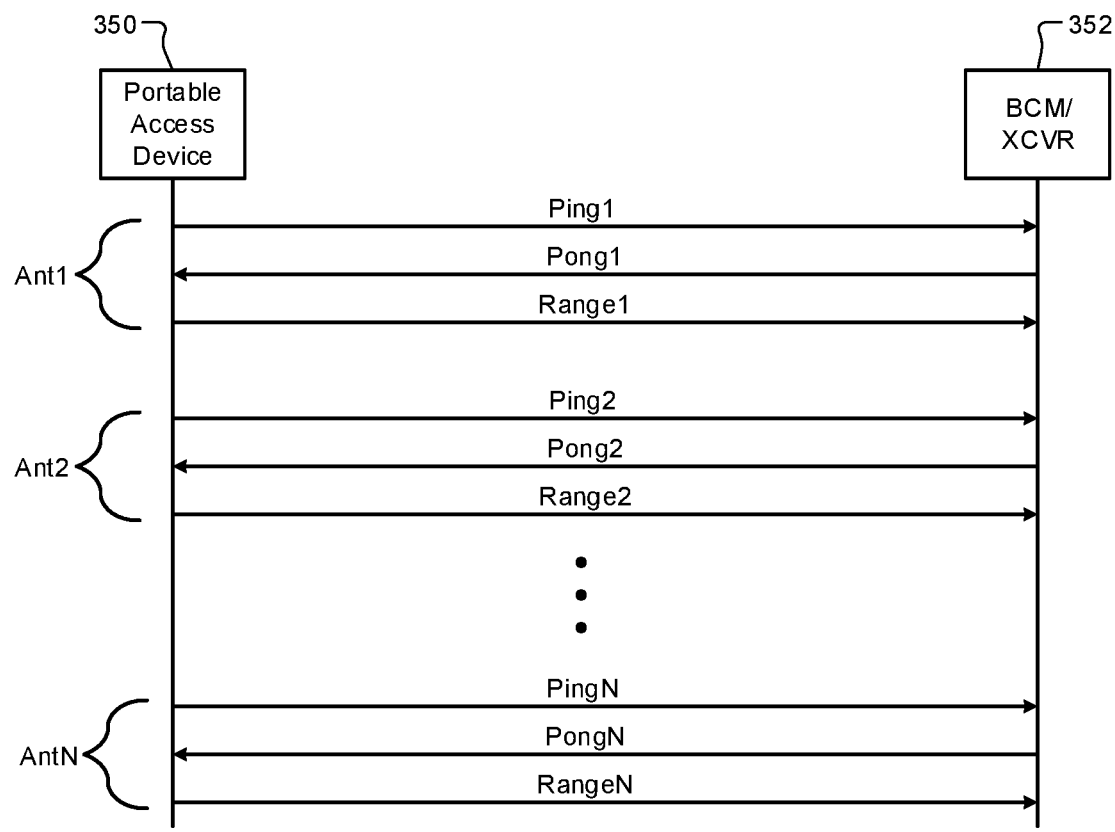
FIG. 6 is a signal diagram illustrating range determination and reporting in accordance with the present disclosure.
Figure 10:
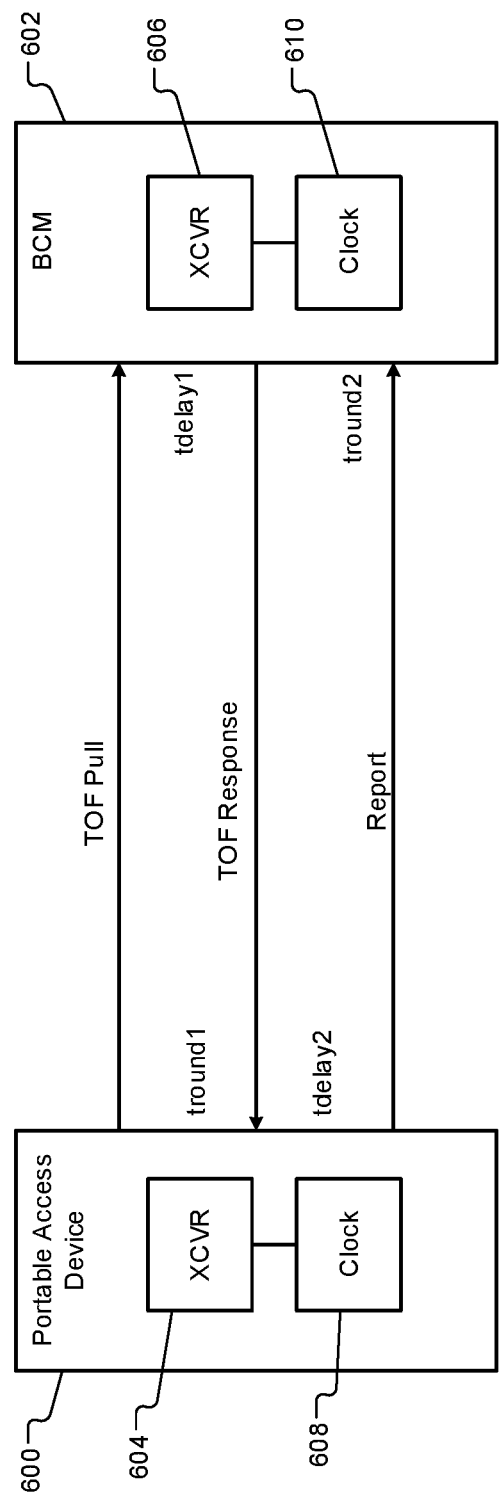
FIG. 10 is a functional block and signal diagram illustrating time-of-flight determination and reporting.

The transceivers 82, 84 may control operation of the multiplexers 86, 88. The transceivers 82, 84 are connected to respective sets of the antenna circuits 72. In one embodiment, the transceiver 82 is connected to different antenna circuits than the transceiver 84. In another embodiment, each of the antenna circuits 72 is connected to only one of the multiplexers 86, 88. The transceivers 82, 84 may cycle through the antenna circuits 72 to measure, for example, times of flight and round trip times of signals transmitted between the antenna circuits 72 and portable access devices. Example signals are shown in FIGS. 6 and 10. In one embodiment, each of the transceivers allocates periods of time for transmitting and receiving signals via the antenna circuits 72. During each allocated period of time, the corresponding transceiver may transmit one or more signals to and receive one or more signals from a portable access device via one of the antenna circuits 72 associated with the period of time.

The antenna circuits 72 may each include a passive circuit 100 and an antenna 102. The passive circuits 100 may include one or more filters, one or more balance circuits, and/or other passive components, devices, and/or circuits.

Although the transceivers 82, 84 and multiplexers 86, 88 are shown as being implemented as part of the BCM 70, the transceivers 82, 84 and multiplexers 86, 88 may be implemented external to the BCM 70. In one embodiment, one or both of the transceivers 82, 84 and/or one or both of the multiplexers 86, 88 are implemented at one or two of the antenna circuits 72.

Figure 4:
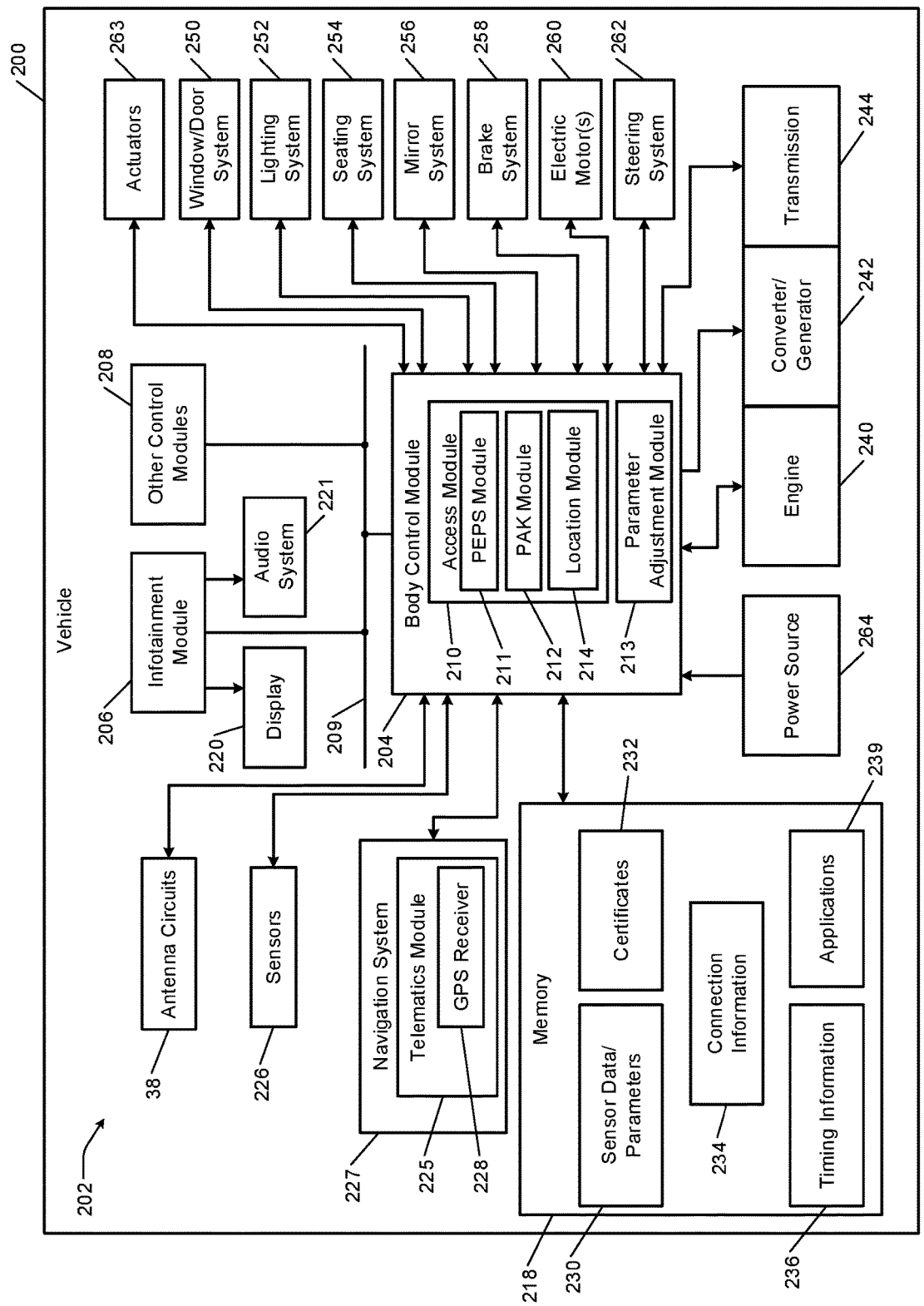
FIG. 4 a functional block diagram of an example of a vehicle including a body control module in accordance with an embodiment of the present disclosure.
Figure 5:
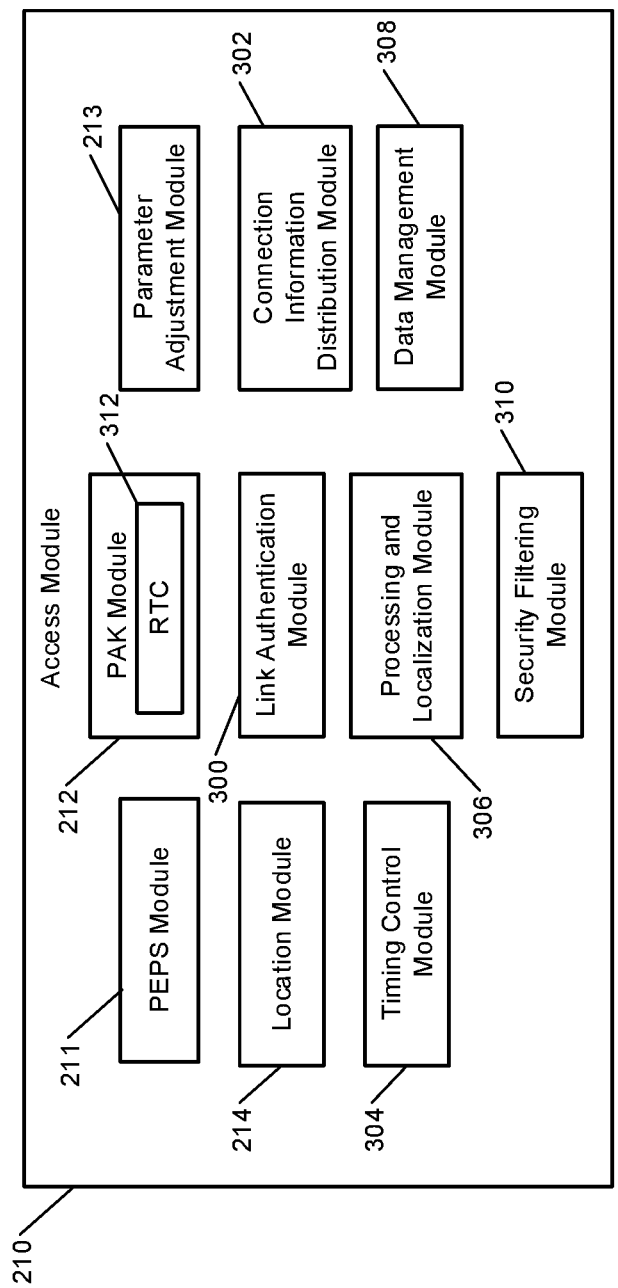
FIG. 5 is a functional block diagram of an example of an access module in accordance with the present disclosure.

FIG. 4 shows a vehicle 200 that is an example of the vehicle 30 of FIG. 1. The vehicle 200 includes a PAK system 202, which includes a BCM 204, an infotainment module 206 and other control modules 208. The modules 204, 206, 208 may communicate with each other via a bus 209 and/or other vehicle interface (e.g., the vehicle interface 45 of FIG. 1). As an example, the bus 209 may include a controller area network (CAN) bus, a local interconnect network (LIN) for lower data-rate communication, a clock extension peripheral interface (CXPI) bus and/or one or more other vehicle interfaces. The BCM 204 may control operation of vehicles systems. The BCM 204 may include an access module 210, a PEPS module 211, a PAK module 212 a parameter adjustment module 213 and a location module 214, as well as other modules, which are shown in FIG. 5.

The BCM 204 may be implemented as any of the other BCMs (e.g., 36 and 70 of FIGS. 1 and 3) referred to herein. The BCM 204 may also include one or more processors that are configured to execute instructions stored in a non-transitory computer-readable medium, such as the memory 218, which may include read-only memory (ROM) and/or random access memory (RAM).

The PEPS module 211 may perform PEPS operations to provide access to an interior of the vehicle and permit starting and/or operation of the vehicle. The PAK module 212 operates in cooperation with the PEPS module 211 and performs PAK operations as described herein. The PEPS module 211 may include the PAK module 212 or the modules 211, 212 may be implemented as a single module. The parameter adjustment module 213 may be used to adjust parameters of the vehicle 200. The location module 214 determines ranges, AOAs, AODs and locations of portable access devices, as described herein. These features are further described below.

The PAK system 202 may further include: a memory 218; a display 220; an audio system 221; and the antenna circuits 38. The antenna circuits 38 may be connected to RF transceivers, which may be implemented by the BCM 204 or separate from the BCM 204.

The transceivers 82, 84 may be used to communicate with a portable access device (e.g., the portable access devices of FIG. 1) including transmission of wireless personal area network (e.g., Bluetooth® network) signals at 2.4 gigaHertz (GHz). The transceivers 82, 84 may include BLE radios, transmitters, receivers, etc. for transmitting and receiving RF signals. The transceivers 82, 84 may implement an access application having code to inspect timestamped data received and transmitted by the antenna circuits 72. The access application may confirm whether the antenna circuits 72 have, for example, received correct data at the correct time. The access application may be stored in the memory 218 and implemented by the PEPS module 211 and/or the PAK module 212. Other example operations of the access application are further described below.

The access application may implement a Bluetooth® protocol stack that is configured to provide a channel map, access identifier, next channel, and a time for a next channel. The access application is configured to output timing signals for timestamps of signals transmitted and received via the antenna circuits 38. The access application may obtain channel map information and timing information and share this information with other modules in the vehicle.

The PAK system 202 may further include: a telematics module 225; sensors 226; and a navigation system 227 including a global positioning system (GPS) receiver 228. The telematics module 225 may communicate with a server via a cell tower station. This may include the transfer of certificates, license information, and/or timing information including global clock timing information. The telematics module 225 is configured to generate location information and/or error of location information associated with the vehicle 200. The telematics module 225 may be implemented by a navigation system 227.

The sensors 226 may include sensors used for PEPS and PAK operations, cameras, objection detection sensors, temperature sensors, accelerometers, vehicle velocity sensor, and/or other sensors. The sensors 226 may include a touch sensor to detect, for example, a person touching a door handle to initiate a process of waking up a portable access device. The sensors 226 may be connected to the other control modules 208, such as the body control module 204, which may be in communication with RF transceivers disclosed herein. The GPS receiver 228 may provide vehicle velocity and/or direction (or heading) of the vehicle and/or global clock timing information.

The memory 218 may store sensor data and/or parameters 230, certificates 232, connection information 234, timing information 236, and applications 239. The applications 239 may include applications executed by the RF transceivers and/or the modules 204, 206, 208, 210, 211, 212, 214. As an example, the applications may include the access application, a PEPS application and/or a PAK application executed by the RF transceivers and the modules 210, 211, 212 and/or 214. Although the memory 218 and the BCM 204 are shown as separate devices, the memory 218 and the BCM 204 may be implemented as a single device. The single device may include one or more other devices shown in FIG. 1.

The BCM 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208, 210, 211, 212, 213, 214. The BCM 204 may perform PEPS and/or PAK operations, which may include setting some of the parameters. The PEPS and PAK operations may be based on signals received from the sensors 226 and/or RF transceivers. The BCM 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the PEPS and PAK operations may include unlocking doors of the window/door system 250, enabling fuel and spark of the engine 240, starting the electric motors 260, powering any of the systems 250, 252, 254, 256, 258, 262, and/or performing other operations as are further described herein.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the BCM 204 to, for example, adjust fuel, spark, air flow, steering wheel angle, throttle position, pedal position, door locks, window position, seat angles, etc. The actuators may include motors, gears, linkages, drivers, etc. Example actuators 263 are shown in FIG. 4 and may be part of the stated systems. This control may be based on the outputs of the sensors 226, the navigation system 227, the GPS 228 and the above-stated data and information stored in the memory 218.

FIG. 5 shows the access module 210. The access module 210 includes the PEPS module 211, the PAK module 212, the parameter adjustment module 213, the location module 214 and may further include a link authentication module 300, a connection information distribution module 302, a timing control module 304, a processing and localization module 306, a data management module 308 and a security filtering module 310. The PAK module 212 may include a real time clock (RTC) 312 that maintains a local clock time.

The link authentication module 300 may authenticate the portable access devices of FIG. 1 and establish the secure communication link. For example, the link authentication module 300 can be configured to implement challenge-response authentication or other cryptographic verification algorithms in order to authenticate the portable access devices.

The connection information distribution module 302 is configured to communicate with the transceivers and provide the transceivers with communication information necessary for the transceivers to find and then follow, or eavesdrop on, the secure communication link. This may occur once the transceivers are synchronized with a communication gateway, which may be included in or implemented by one of the transceivers described above. As an example, the vehicle 200 and/or the PAK system 202 may include any number of antenna circuits disposed anywhere on the vehicle 200 for detecting and monitoring mobile devices. The connection information distribution module 302 is configured to obtain information corresponding to communication channels and channel switching parameters of a communication link and transmit the information to the sensors 226. In response to the sensors 226 receiving the information from the connection information distribution module 302 via a bus or other vehicle interface disclosed herein and the transceivers being synchronized with the communication gateway, the transceivers may locate and follow, or eavesdrop on, the communication link.

The timing control module 304 may: maintain the RTC and/or currently stored date if not handled by the PAK module 212; disseminate current timing information with the transceivers; generate timestamps for incoming and outgoing messages, requests, signals, certificates, and/or other items; calculate round trip times; etc. A round trip time may refer to the amount between when a request is generated and/or transmitted and a time when a response to the request is received. The timing control module 304 may obtain timing information corresponding to a communication link when the link authentication module 300 executes challenge-response authentication. The timing control module 304 is also configured to provide the timing information to the transceivers.

After link authentication is established, the data management module 308 collects the current location of the vehicle 200 from the telematics module 225 and may share the location with the portable access devices. The portable access devices optionally include GPS modules and application software that when executed compares the estimated relative locations of the portable access devices to the vehicle 200. This may be done in addition to the other location determination operations described herein, which may be performed by the location module 214. Based on the estimated positions of the portable access devices relative to the vehicle, the portable access devices may send signals to one of the RF transceivers requesting the vehicle to perform certain actions. As an example, the data management module 308 is configured obtain vehicle information obtained by any of the modules (e.g., location information obtained by a telematics module 225) and transmit the vehicle information to the portable access devices.

The security filtering module 310 detects violations of a physical layer and protocol and filter data accordingly before providing information to the processing and localization module 306. The security filtering module 310 flags data as injected such that the processing and localization module 306 is able to discard data and alert the PEPS module 211. The data from the processing and localization module 306 is passed along to the PEPS module 211, whereby the PEPS module 211 is configured to read vehicle state information from the transceivers in order to detect user intent to access a feature and to compare the location of the mobile device to a set of locations that authorize certain vehicle features, such as unlocking a door or trunk of the vehicle and/or starting the vehicle.

The access module 210 may measure a received signal strength of a signal received from the portable access device and generate a corresponding RSSI value. Additionally or alternatively, the access module 210 may take other measurements of transmitted and received signals from the portable access device, such as an angle of arrival, an angle of departure, a time of flight, a time of arrival, a time difference of arrival, etc. These measurements may be used in determining phase determination, standard deviation of AOA, standard deviation of RSSI, standard deviation of phase, and other parameters, some of which are described below. As an example, time of flight calculations may be made to measure time of flight of UWB signals. The access module 210 may determine a location of and/or distance to the portable access device relative to the corresponding vehicle based on the measured information. The location and distance determinations may be based on similar information received from one or more of the transceivers of the vehicle.

As an example, the access module 210 may determine the location of the portable access device based on, for example, the patterns of the RSSI values corresponding to signals received from the portable access device by the antenna circuits 38 of FIG. 1. A strong (or high) RSSI value indicates that the portable access device is close to the vehicle and a weak (or low) RSSI value indicates that the portable access device is further away from the vehicle. By analyzing the RSSI values, the access module 210 may determine a location of and/or a distance to the portable access device relative to the vehicle. Additionally or alternatively, angle of arrival, angle of departure, round trip timing, unmodulated carrier tone exchange, or time difference of arrival measurements for the signals sent between the portable access device and the antenna circuits 38 may also be used by the access module 210 or the portable access device to determine the location of the portable access device. Additionally or alternatively, the transceivers may determine the location of and/or distance to the portable access device based on the measured information and communicate the location or distance to the access module 210.

Based on the determined location of or distance to the portable access device relative to the vehicle, the modules 211, 212 of FIG. 4 may then authorize and/or perform a vehicle function, such as unlocking a door of the vehicle, unlocking a trunk of the vehicle, starting the vehicle, allowing the vehicle to be started, and/or other functions, some of which are described herein. As another example, if the portable access device is less than a first predetermined distance from the vehicle, the modules 211, 212 may activate interior or exterior lights of the vehicle. If the portable access device is less than a second predetermined distance from the vehicle, the modules 211, 212 may unlock doors or a trunk of the vehicle. If the portable access device is located inside of the vehicle, the modules 211, 212 may allow the vehicle to be started.

FIG. 6 shows a signal diagram illustrating range determination and reporting via a portable access device 350 (e.g., one of the portable access devices refers to above) and a BCM and/or transceiver 352 of a vehicle (e.g., one of the BCMs and/or one or the transceivers referred to above). In the example, shown sets of signals are transmitted and received via respective antenna circuits of the vehicle during allocated periods of time. Each of the sets of signals may include a ping signal, a pong signal and a range signal. For example, the portable access device 350 may transmit a ping signal to the BCM and/or transceiver 352 via an antenna circuit and in response thereto receive a pong signal. The control module of the portable access device 350 may then determine TOF information and/or round trip time for the ping and pong signals including delay for the BCM and/or transceiver 352 to respond to the ping signal. The portable access device 350 may determine range information based on the TOF and round trip time information. The range information may be transmitted as the range signal to the BCM and/or transceiver 352. Between transmissions of the sets of ping, pong, and range signals, the transceiver may select a next one of the antenna circuits by controlling state of a multiplexer (e.g., one of the above-stated multiplexers). The control module of the portable access device may determine a location of the portable access device relative to the vehicle based on the range information determined in association with each of the antenna circuits. The control module may share the location with the BCM and/or transceiver 352.

In an alternative embodiment, the BCM and/or transceiver 352 transmits the ping signals and receives the pong signals and determines the range information. The BCM and/or the transceiver 352 may cycle through the antenna circuits, determine range of the portable access device based on each set of transmitted and received signals, and determine the location of the portable access device based on the ranges determines.

Figure 7:
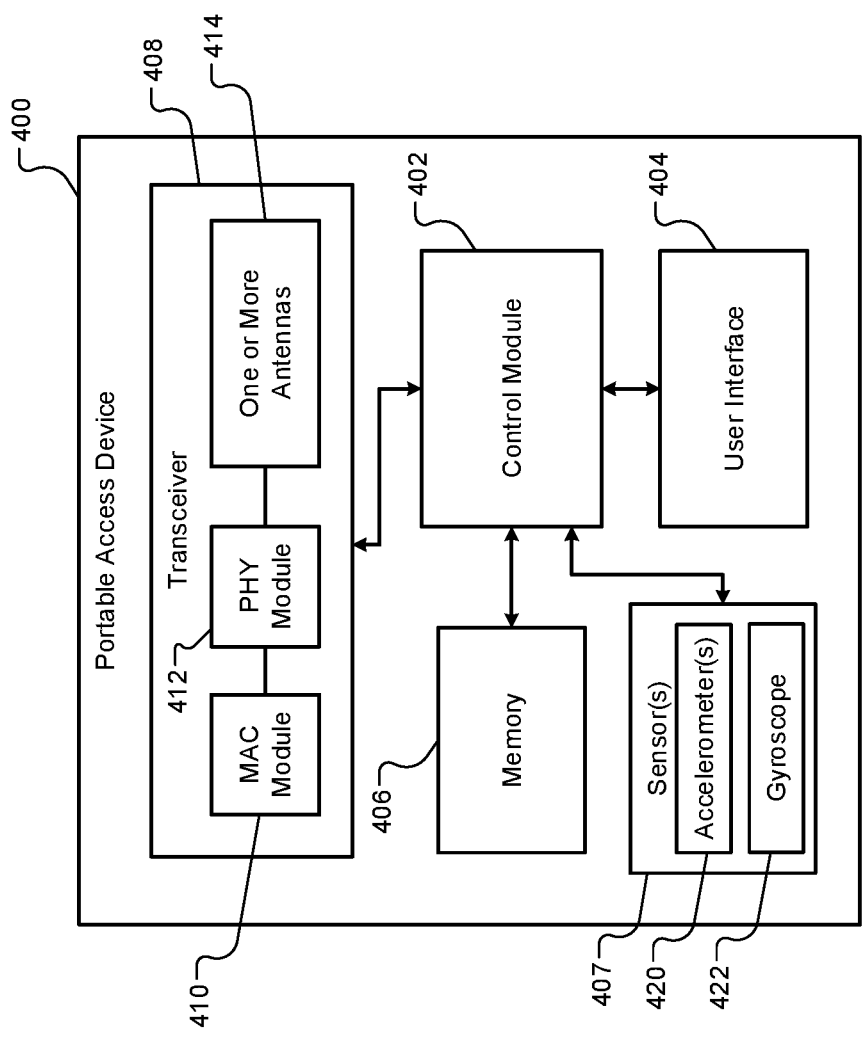
FIG. 7 is a functional block diagram of an example of a portable access device in accordance with an embodiment of the present disclosure.

FIG. 7 shows an example portable access device 400, which is an example of one of the portable access devices 32, 34 of FIG. 1 and the portable access device 52 of FIG. 2. The portable access device 400 may include a control module 402, a user interface 404, a memory 406, sensors 407 and a transceiver 408. The transceiver 408 may include a medium access control (MAC) module 410, a physical layer (PHY) module 412 and one or more antennas 414.

The control module 402 may include or be part of a BLE communication chipset. Alternatively, the control module 402 may include or be part of a Wi-Fi or Wi-Fi direct communication chipset. The memory 406 may store application code that is executable by the control module 402. The memory 406 may be a non-transitory computer-readable medium including read-only memory (ROM) and/or random-access memory (RAM).

The control module 402 communicates with the transceivers and the access module 210 of the vehicle and performs authentication and other operations as further described below. The control module 402 may transmit information regarding the portable access device 400, such as location, heading and/or velocity information obtained from one or more of the sensors 407 (e.g., a global navigation satellite system (e.g., GPS) sensor, an accelerometer, a gyroscope, and/or an angular rate sensor). In the example shown, the sensors 407 include one or more accelerometers 420 and/or a gyroscope 422. The user interface 404 may include a key pad, a touch screen, a voice activated interface, and/or other user interface.

The control module 402 may operate similarly as the control module 59 of FIG. 2. The control module 402 may determine AOAs, AODs, phases, and/or other signal information, such as RSSI values. The control module 402 may also determine a location of the portable access device 400 and/or speed and heading of the portable access device 400. This information may be shared with the transceivers and the access module 210 of the vehicle. The control module 402 may also determine standard of deviation of phase for different channels (or frequencies), standard of deviation of RSSI values of different channels, etc. and share this information with the transceivers and the access module 210.

Figure 8:
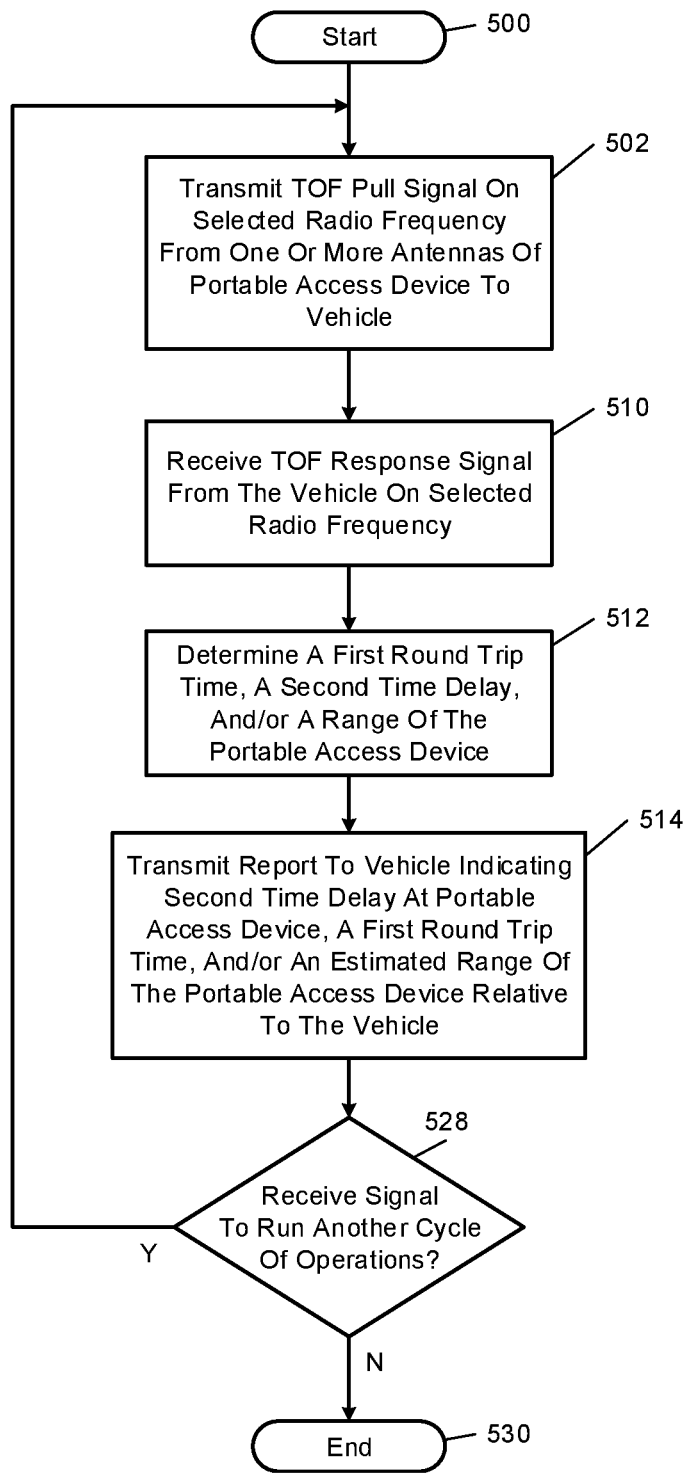
FIG. 8 illustrates a first portion of an access method implemented via a control module of a portable access device in accordance with the present disclosure.
Figure 9:
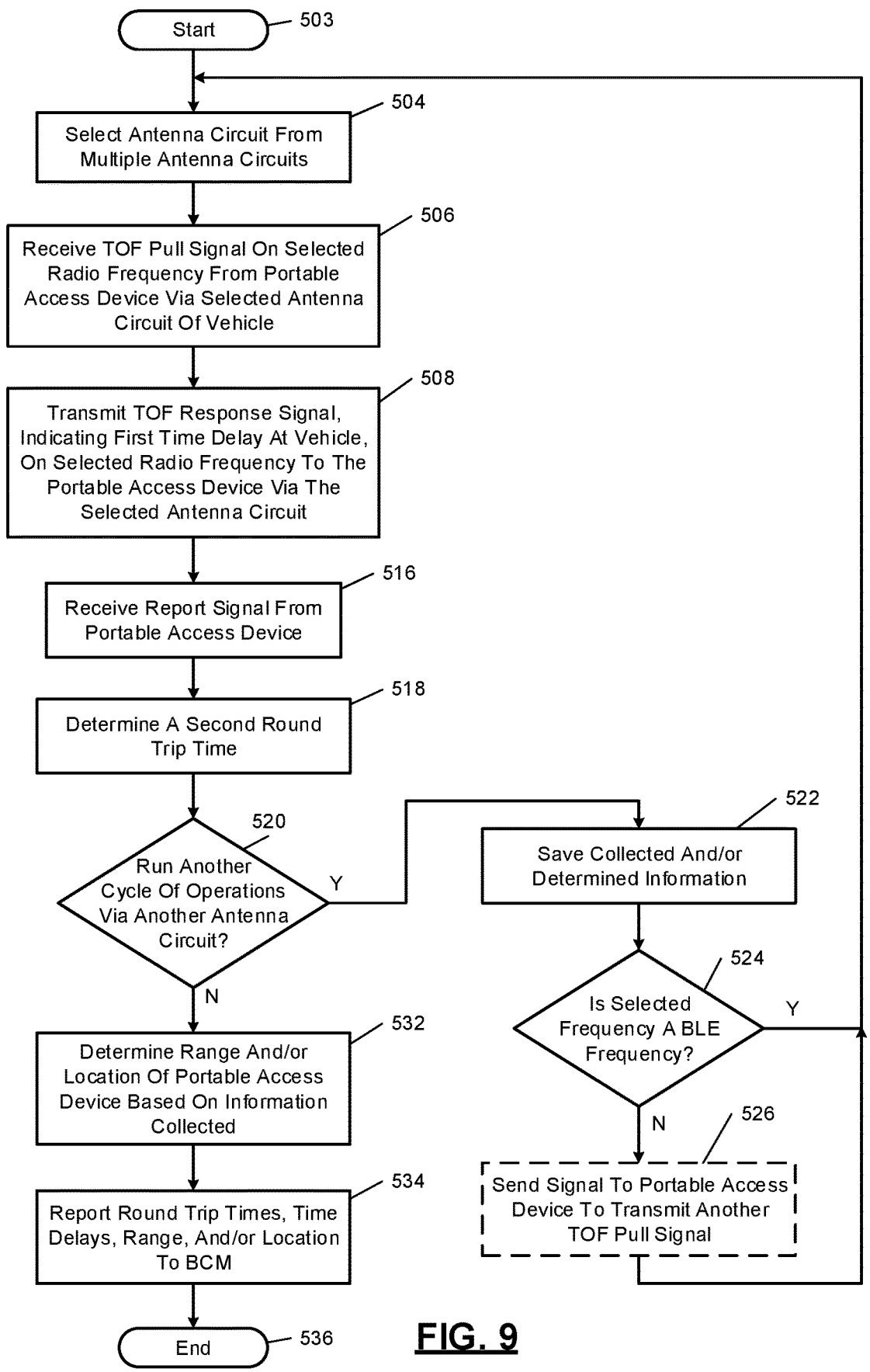
FIG. 9 illustrates a second portion of the access method implemented via an access module of a vehicle in accordance with the present disclosure.

Operations of the BCMs and transceiver(s) of the vehicles and control modules of the portable access devices disclosed herein are further described below with respect to the access method of FIGS. 8-9. FIGS. 8-9 show first and second portions of the access method. The first portion may be implemented via a control module of a portable access device. The second portion may be implemented by an access module and transceiver of a vehicle. The operations of the first portion of FIG. 8 correspond with the operations of the second portion of FIG. 9. The operation numbers of FIGS. 8-9 are provided as an example of the order in which the operations may be performed. This order of the operations is provided as an example; the operations may be performed in a different order and/or overlap in time.

Although the following operations are primarily described with respect to the implementations of FIGS. 1-7 and 10, the operations may be easily modified to apply to other implementations of the present disclosure. The operations may be iteratively performed.

The first portion of the access method may begin at 500. At 502, the control module of the portable access device transmits a TOF pull signal on a selected radio frequency from one or more antennas of the portable access device to the vehicle. The TOF pull signal may be a UWB signal, a BLE signal or other RF signal.

The second portion of the method may begin at 503. At 504, the transceiver selects via a corresponding multiplexer an antenna circuit from multiple antenna circuits. While performing the method, the transceiver may cycle through multiple antenna circuits for time multiplexing of signal transmission via the antenna circuits to perform localization. During each cycle signals are received and transmitted using the corresponding one of the antenna circuits. If the vehicle includes multiple transceivers, each of which being connected to a respective set of antenna circuits, the method and/or operations thereof may be performed for each transceiver and corresponding antenna circuits. Each transceiver may sweep all corresponding antenna circuits. The BCM may transfer control to a next transceiver after a current transceiver has finished cycling through the corresponding antenna circuits. Although the following operations are primarily described as being performed by a transceiver, the operations may be performed by the BCM if, for example, the transceiver is implemented as part of the BCM.

The method disclosed herein include transceivers that are located away from at least some of the antenna circuits and sweep through the antenna circuits to perform an exchange of signals with a portable access device for each antenna circuit. Each transceiver may continue to switch between corresponding antenna circuits until a ping signal is received from the portable access device. The transceiver may then perform an exchange of signals with the portable access device to provide a range estimate. In one embodiment, only one transceiver is operating at any moment in time. When one transceiver has completed sweeping through the corresponding antenna circuits, that transceiver may signal the BCM and/or the next transceiver to sweep through a next set of antenna circuits. In one embodiment, sweeping of antenna circuits is performed until a predetermined number of range estimates (e.g., 3 or more) are provided. This is unlike a system in which transceivers are collocated with a same number of antennas of a vehicle and are listening at a same time for a ping signal from a portable access device and one of the transceivers takes over and exchanges signals with a portable access device to provide a range estimate. After the range estimate is provided, the portable access device then sends another ping for another one of the transceivers.

At 506, the transceiver receives the TOF pull signal on the selected radio frequency from the portable access device via the selected antenna circuit.

At 508, the transceiver generates and transmits a TOF response signal, which may indicate a first time delay, via the selected antenna circuit to the portable access device on the selected radio frequency. The first time delay may refer to an amount of time from when the TOF pull signal is received to the time when the transceiver transmits the TOF response signal. Timestamps may be recorded when the TOF pull signal is received and when the TOF response signal are transmitted. These timestamps may be shared with the control module of the portable access device and/or the BCM.

At 510, the control module of the portable access device receives the TOF response signal from the vehicle. A timestamp of when the TOF response signal is received may be recorded.

At 512, the control module may determine a first round trip time, which may be equal to a sum of an amount of time to transmit the TOF pull signal, the first delay and an amount of time to transmit the TOF response signal. The control module may also determine a second time delay from when the control module receives the TOF response signal to when the control module transmits a report signal at 514. The control module may further determine a range of the portable access device relative to the vehicle based on the first round trip time, the first time delay, the transmit and receive timestamps of the TOF pull signal and/or the transmit and receive timestamps of the TOF response signal.

At 514, the control module generates and transmits a report in the form of a report signal to the transceiver of the vehicle. The report may indicate the timestamp of when the TOF response signal is received, a timestamp of when the report signal is transmitted, the first round trip time, the second time delay and/or an estimated range of the portable access device relative to the vehicle.

At 516, the transceiver of the vehicle receives the report from the control module. The information in the report may be stored in memory and/or provided to the BCM. This may include a timestamp of when the report signal is received at the transceiver, which may be recorded by the transceiver.

At 518, the transceiver may determine a second round trip time based on the transmit and receive timestamps of the TOF response signal, transmit and receive timestamps of the report signal, the second round trip time, the second time delay, and/or the estimated range.

At 520, the transceiver determines whether to run another cycle of operations via another antenna circuit. If yes, operation 522 is performed, otherwise operation 532 may be performed.

At 522, the transceiver saves the collected and/or determined above described information. At 524, the transceiver determines whether the selected frequency and/or transmitted signals are (i) on a BLE frequency and/or BLE signals (or other RF signals having long pulses that do not require transmission of another TOF pull signal), or (ii) on a UWB frequency and/or UWB signals (or other RF signals that do require transmission of another TOF pull signal). If the transmitted signals are BLE signals or the like having long pulses that are able to be quickly sampled using multiple sequentially selected antenna circuits (not using multiple antenna circuits at same time), then operation 504 may be performed. If the transmitted signals are UWB signals or the like having short pulses that are not able to be sampled using multiple sequentially selected antenna circuits (not using multiple antenna circuits at same time), then operation 526 may be performed.

At 526, the transceiver may send a signal to the portable access device to transmit another TOF pull signal.

At 528, the control module of the portable access device in response to receiving the signal to transmit another TOF pull signal returns to operation 502. If a signal is not received from the transceiver of the vehicle to transmit another TOF pull signal, the first portion of the method may end at 530.

At 532, the transceiver of the vehicle determines a range and/or location of the portable access device based on any of above-described information collected and/or determined. A range estimate may be provided by the control module of the portable access device and/or determined by the transceiver during each cycle and in association with each antenna circuit. The location may be determined based on the range estimates received and/or determined using the antenna circuits. The location may be determined using triangulation.

At 534, the transceiver may report the collected and/or determined information including the timestamps, round trip times, time delays, ranges, and/or location to the BCM, which may then, for example, determine whether to provide access to the vehicle and/or control over systems of the vehicle based on the received information as described above. The second portion of the method may end at 536.

The above-described operations of FIGS. 8-9 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The TOF of a trip including a transmission signal (e.g., TOF pull signal) and a receive signal (e.g., TOF response signal) and/or the average TOF may also be determined and shared by the control module of the portable access device and the transceiver of the vehicle while performing the above method. These parameters may be determined by the controller and/or the transceiver. As an example, an average TOF of signals of a round trip may be determined by (i) summing the TOF of a transmitted signal and the TOF of the received signal, (ii) subtracting the time delay from when the transmitted signal is received and when the receive signal is transmitted, and (iii) dividing the resultant value by 2 (average TOF of signals=(tround-tdelay/2). The total TOF is the sum of the TOF of a transmitted signal and the TOF of the received signal.

The above methods of FIGS. 8-9 although described as transmitting TOF signals and determining a TOF value, a range, and/or a location based thereon, the methods may include similar operations for transmitting RSSI signals and determining a RSSI value. A range and/or location may be determined based on the RSSI value. RSSI pull and RSSI response signals, as well as corresponding report signals may be transmitted. The signals may be transmitted for each antenna circuit as described above for TOF signals.

FIG. 10 shows a portable access device 600 and a BCM 602 including respective transceivers 604, 606 and clocks 608, 610. The portable access device 600 and the BCM 602 may perform and/or be configured similarly as any of the other portable access devices and/or BCMs disclosed herein. Operations of the transceivers 604, 606 are performed based on frequencies of the clocks 608, 610. The portable access device 600 and the BCM 602 may exchange signals to synchronize the frequencies of the clocks 608, 610. As an example, the first transceiver 604 may transmit a TOF pull signal to the BCM 602. The second transceiver 606 may respond with a TOF response signal. Delay from when the second transceiver 606 receives the TOF pull signal to when the second transceiver 606 transmits the TOF response signal is identified as tdelay1. The round trip time associated with the TOF pull signal, the TOF response signal and the tdelay1 is identified as tround1.

The transceiver 604 may transmit a report signal to the second transceiver 606, as described above. The time delay from when the TOF response signal is received to when the report signal is transmitted is identified as tdelay2. The round trip time associated with the TOF response signal, the report signal and the tdelay2 is identified as tround2.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a first plurality of antenna circuits each of which having a respective antenna and a respective passive circuit, the plurality of antenna circuits being void of transceivers;
a first multiplexer connected to the first plurality of antenna circuits;
a first transceiver connected to the first multiplexer and configured to cycle through the first plurality of antenna circuits to facilitate determination of a location of a portable access device relative to a vehicle, wherein the first transceiver is configured to allocate periods of time for each of the first plurality of antenna circuits and during each period of time exchange radio frequency signals with the portable access device to obtain at least one of (i) timing information associated with transmission of the radio frequency signals, (ii) received signal strength indicator information associated with transmission of the radio frequency signals, or (iii) range estimates of the portable access device relative to the vehicle, wherein the range estimates are estimates of distances between the first plurality of antenna circuits and the portable access device, and wherein the location is determined based on the at least one of the timing information, the received signal strength indicator information or the range estimates; and
a control module configured to, based on the determined location, provide at least one of access to the vehicle or control of a vehicle system.

2. The system of claim 1, wherein the exchanged radio frequency signals include ultra-wideband signals.

3. The system of claim 1, wherein the exchanged radio frequency signals are wireless personal area network signals at a frequency of 2.4 GHz.

4. The system of claim 1, further comprising:
a second plurality of antenna circuits;
a second multiplexer connected to the second plurality of antenna circuits; and
a second transceiver connected to the second multiplexer and configured to cycle through the second plurality of antenna circuits to facilitate determination of the location of the portable access device relative to the vehicle, wherein the second transceiver is configured to allocate periods of time for each of the second plurality of antenna circuits and during each period of time exchange second radio frequency signals with the portable access device to obtain at least one of (i) timing information associated with transmission of the second radio frequency signals, (ii) received signal strength indicator information associated with transmission of the second radio frequency signals, or (iii) range estimates of the portable access device relative to the vehicle, wherein the range estimates obtained by the second transceiver are estimates of distances between the second plurality of antenna circuits and the portable access device, and wherein the location is determined based on the at least one of the timing information, the received signal strength indicator information or the range estimates obtained by the second transceiver.

5. The system of claim 4, wherein:
- the second transceiver is configured to control the second multiplexer to cycle through the second plurality of antenna circuits to determine the range estimates of the distances between the second plurality of antenna circuits and the portable access device; and
- the location of the portable access device is determined based on the range estimates.

6. The system of claim 1, wherein at least one of the first transceiver or the first multiplexer is implemented as part of the control module.

7. The system of claim 1, wherein the timing information includes timestamps of the exchanged radio frequency signals, round trip times associated with the exchanged radio frequency signals, a time delay at the first transceiver, and a time delay at the portable access device.

8. The system of claim 1, wherein the first transceiver is configured to determine the location based on the at least one of the timing information, the received signal strength indicator information or the range estimates.

9. The system of claim 1, wherein the control module is configured to determine the location based on the at least one of the timing information, the received signal strength indicator information or the range estimates.

10. The system of claim 1, wherein the first transceiver is configured to determine the range estimates based on the timing information.

11. The system of claim 1, wherein the first transceiver is configured to determine the range estimates based on the received signal strength indicator information.

12. The system of claim 1, wherein the first transceiver is configured to receive the range estimates from the portable access device.

13. The system of claim 1, wherein:
- the first transceiver is configured to control the first multiplexer to cycle through the first plurality of antenna circuits to determine the range estimates of the distances between the first plurality of antenna circuits and the portable access device; and
- the location of the portable access device is determined based on the range estimates.

14. A system comprising:
- an actuator; and
- a body control module comprising
    - a first multiplexer connected to a first plurality of antenna circuits, wherein the antenna circuits are separate from the body control module and are disposed in respective locations on a vehicle, each of the first plurality of antenna circuits having a respective antenna and a respective passive circuit, the plurality of antenna circuits being void of transceivers,
    - a first transceiver connected to the first multiplexer and configured to cycle through the first plurality of antenna circuits to facilitate determination of a location of a portable access device relative to the vehicle, wherein the first transceiver is configured to, for each of the first plurality of antenna circuits, exchange radio frequency signals with the portable access device to obtain at least one of (i) timing information associated with transmission of the radio frequency signals, (ii) received signal strength indicator information associated with transmission of the radio frequency signals, or (iii) range estimates of the portable access device relative to the vehicle, wherein the range estimates are estimates of distances between the first plurality of antenna circuits and the portable access device, and wherein the location is determined based on the at least one of the timing information, received signal strength indicator information or the range estimates, and
    - an access module configured to, based on the determined location, control the actuator to provide at least one of access to the vehicle or control of a vehicle system.

15. The system of claim 14, wherein the exchanged radio frequency signals include ultra-wideband signals.

16. The system of claim 14, wherein the exchanged radio frequency signals are wireless personal area network signals at a frequency of 2.4 GHz.

17. The system of claim 14, wherein the body control module further comprises:
- a second multiplexer connected to a second plurality of antenna circuits; and
- a second transceiver connected to the second multiplexer and configured to cycle through the second plurality of antenna circuits to facilitate determination of the location of the portable access device relative to the vehicle, wherein the second transceiver is configured to, for each of the second plurality of antenna circuits, exchange second radio frequency signals with the portable access device to obtain at least one of (i) timing information associated with transmission of the second radio frequency signals, (ii) received signal strength indicator information associated with transmission of the second radio frequency signals, or (iii) range estimates of the portable access device relative to the vehicle, wherein the range estimates obtained by the second transceiver are estimates of distances between the second plurality of antenna circuits and the portable access device, and wherein the location is determined based on the at least one of the timing information, received signal strength indicator information or the range estimates obtained by the second transceiver.

18. The system of claim 14, wherein:
- the timing information includes at least one of (i) timestamps of the exchanged radio frequency signals, (ii) round trip times associated with the exchanged radio frequency signals, (iii) a time delay at the first transceiver, or (IV) a time delay at the portable access device; and
- the body control module is configured to determine the location based on the timing information.

19. The system of claim 14, wherein the body control module is configured to determine the location based on the range estimates.

20. The system of claim 14, wherein the first transceiver is configured to determine the location based on the at least one of the timing information, the received signal strength indicator information or the range estimates.

21. The system of claim 14, wherein the access module is configured to determine the location based on the at least one of the timing information, the received signal strength indicator information or the range estimates.

22. The system of claim 14, wherein the first transceiver is configured to determine the range estimates based on the timing information.

23. The system of claim 14, wherein the first transceiver is configured to determine the range estimates based on the received signal strength indicator information.

24. The system of claim 14, wherein the first transceiver is configured to receive the range estimates from the portable access device.

* * * * *

UNITED STATES PATENT AND TRADEMARK OFFICE
CERTIFICATE OF CORRECTION

| | |
|---|---|
| PATENT NO. | : 11,447,099 B2 |
| APPLICATION NO. | : 16/996181 |
| DATED | : September 20, 2022 |
| INVENTOR(S) | : Osman Ahmed et al. |

It is certified that error appears in the above-identified patent and that said Letters Patent is hereby corrected as shown below:

In the Claims

Column 22, Line 43, Claim 18: delete "(IV)" and insert --(iv)-- therefor

Signed and Sealed this
Fifteenth Day of November, 2022

Katherine Kelly Vidal
*Director of the United States Patent and Trademark Office*